United States Patent [19]

Faisandier

[11] 4,094,226

[45] June 13, 1978

[54] HYDRAULIC CONTROL APPARATUS WITH FEEDBACK

[76] Inventor: Jacques Faisandier, 32 Bd Felix Faure, 92320 Chatillon-sur-Bagneux, France

[21] Appl. No.: 689,796

[22] Filed: May 25, 1976

[30] Foreign Application Priority Data

May 26, 1975 France .................. 75 16265

[51] Int. Cl.² ............................................. F15B 9/12
[52] U.S. Cl. ......................................... 91/39; 91/381
[58] Field of Search .................... 91/381, 39

[56] References Cited

U.S. PATENT DOCUMENTS

| 1,959,786 | 5/1934 | Hodgkinson | 91/381 |
| 2,412,366 | 12/1946 | Spencer et al. | 91/381 |
| 2,952,245 | 9/1960 | Curlett et al. | 91/381 |
| 3,621,762 | 11/1971 | Ikebe et al. | 91/380 |
| 3,876,030 | 4/1975 | Komomura et al. | 91/381 |

FOREIGN PATENT DOCUMENTS 81,056   9/1951   Czechoslovakia .................. 91/381

Primary Examiner—Paul E. Maslousky

[57] ABSTRACT

Apparatus is presented for the precision control of an output signal in accordance with an input signal. The output signal is the output of a hydraulic motor, the output of which is compared to an electrical input signal in a geared differential comparator, the output of the comparator operating a distributor supplying the hydraulic motor.

5 Claims, 6 Drawing Figures

HYDRAULIC CONTROL APPARATUS WITH FEEDBACK

BACKGROUND OF THE INVENTION

The invention relates to an improvement in devices for controlling a mechanism which produces an output level related to an input level. The devices to which the present invention relates have mechanical means for comparing the output level with the input level to produce a control level or signal. The control level is delivered by suitable transmitting means to the mechanism which produces the output level.

In particular, so-called stepping devices are known, in which the input and output levels are varied in small increments. A very high degree of precision is required in such devices.

An important advance was made in the prior art in replacing the mechanical feedback of the movements of an output member to a comparator by feedback of an electrical signal. However, there are reasons for preferring to use a mechanical feedback.

It has now been found that it is possible to obtain the same precision with mechanical feedbacks as with the electrical feedback, provided that a gear transmission is used which allows a coefficient of reduction of the movement to be achieved which is as high on the input side as on the feedback side, and which allows the taking up of play by action on bevel movement-transmission gears and on reduction gears.

If these conditions are fulfilled it is possible to use hydraulic motors for the output movement which allow rotational speeds greater than those available up to the present time to be obtained.

SUMMARY OF THE INVENTION

In accordance with the present invention an input signal from an electrical stepping motor is converted to an output signal of a hydraulic motor through a differential comparator and transmission system which is highly precise in its operation. The mechanical output signal of the stepping motor is delivered via a reduction gear train to one of the differential gears of a differential comparator. The rotation of the output shaft of the hydraulic motor is transmitted via a reduction gear train to the other differential gear of the differential comparator. A distribution valve, which controls the delivery of operating fluid to the hydraulic motor, is operatively connected to the pinions of the differential comparator. Input to the differential comparator from the electrical stepping motor results in operation of the distributor valve. Feedback from the operation of the hydraulic motor to the differential comparator controls the operation of the distributor valve in accordance with the level of output of the hydraulic motor as compared to the level of input from the electrical stepping motor.

BRIEF DESCRIPTION OF THE DRAWINGS

Referring now to the drawings:

It is to be noted that throughout the drawings with the exception of FIG. 1 the same reference numerals are used throughout. In FIG. 1 the reference numerals correspond to the reference numerals in FIGS. 2 through 6 but are increased by 100 in all cases.

DESCRIPTION OF THE PREFERRED EMBODIMENT

Figure 2:
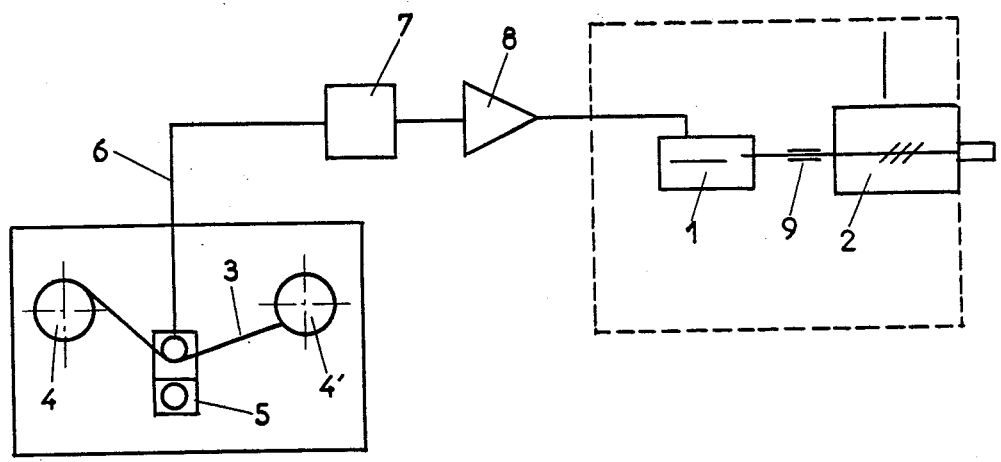
FIG. 2 is a schematic diagram of a general system.

Referring to FIG. 2, an electric stepping motor 1 has an output which is to be delivered to a hydraulic motor 2 to establish the output of hydraulic motor 2. By way of example, a program punched tape 3 travels between winding and unwinding spools 4 and 4' over a reading head 5. Reading head 5 delivers signals through a circuit 6 and a coding transformer 7 to an amplifier 8, the output of amplifier 8 being delivered to operate electrical stepping motor 1. Electrical stepping motor 1 is connected through a mechanical transmission to a hydraulic distributor valve 9 which regulates the supply of pressurized hydraulic operating fluid to motor 2. The basic configuration shown in FIG. 2 is known in the art and requires no further elaboration.

Figure 3:
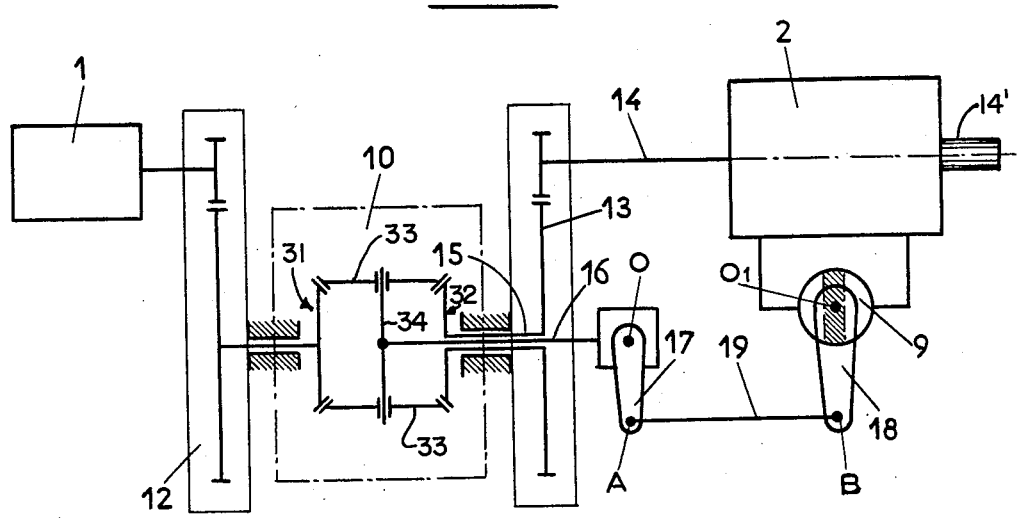
FIG. 3 is a schematic representation of the present invention.
Figure 4:
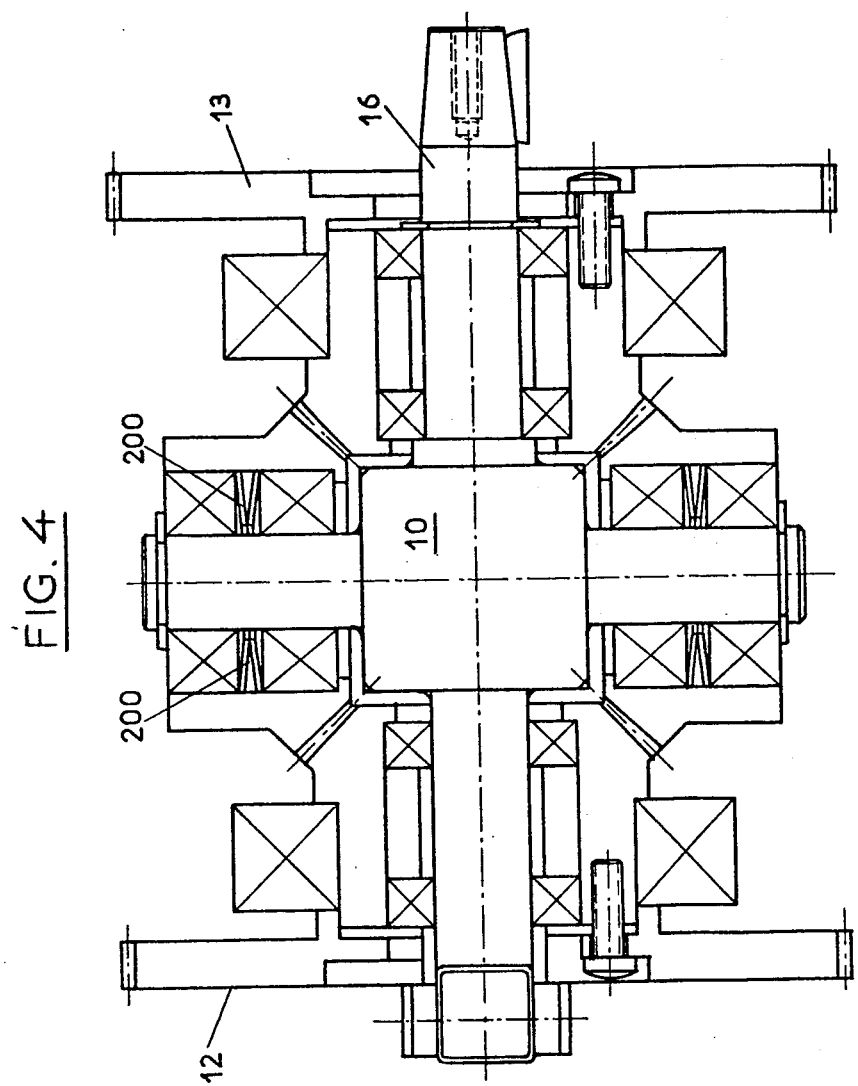
FIG. 4 is a detailed view of a geared differential comparator in accordance with the present invention.

Referring to FIG. 3, the system in accordance with the present invention is shown in schematic form. Hydraulic motor 2 is preferably of the so-called barrel type, i.e. a motor in which the pistons of the cylinder block have their axes parallel to the drive shaft. This type of motor allows the highest rotational speeds to be obtained with the least bulk and least weight for the power developed. Distributor 9, which is in fluid communication with hydraulic motor 2 (by flow conduits not shown), is a known type of rotary slide valve. The slide valve comprising distributor 9 is centered on rollers to minimize friction and is capable of supplying a varying output depending on the position of the valve. In accordance with the present invention a servo controlled device comprised of a geared mechanical differential 10 of the gear type known as conical epicycloidal is employed as a comparator in the system, thus making it possible to achieve a high degree of precision in the system due to the extremely reduced friction level. In addition, provision is incorporated in the gears of the differential 10 for taking up play. This may, for example, be accomplished by the exertion of pressure, through the use of springs on the backs or on one of the backs of two cooperative bevel gears 31 and 32. An example of a prior art differential comparator is shown in FIG. 4. FIG. 4 depicts, in double axial section, a comparator in which springs 200 exert pressure on the conical bevel gears (not shown) of the differential comparator via thrust washers.

Referring again to FIG. 3, a first reduction gear train 12 is connected between stepping motor 1 and gear 31 of differential comparator 10. Another reduction gear train 13 is connected between hydraulic motor 2 and gear 32 of differential 10. The input gear of gear train 12 is connected to the output shaft of motor 1 while the output gear of gear train 12 is connected to differential gear 31 of differential 10. Similarly, the input gear of train 13 is connected to the output shaft of hydraulic motor 2 while the output gear of train 13 is connected to differential gear 32 of differential 10. The reduction ratios of gear trains 12 and 13 are the same if the same input and output speeds for the two motors are desired.

Any rotary movement of the output shaft 14 of motor 2 is transmitted through gear train 13 into the differential 10. The bevel gears of differential comparator 10, in the manner known in the art, are interconnected by a shaft on which both bevel gears are mounted for rotation. Any travel of the bevel gears which are indicated schematically at 33, with respect to either of the differential gears (as distinguished from rotation of the bevel gears about their own axis) results in rotation of the shaft 31 on which the bevel gears are mounted, and that rotation results in rotation of shaft 16 connected to the bevel gear shaft. Rotation of shaft 16 drives a connecting rod assembly consisting of crank arms 17 and 18 and connecting rod 19. As will be described in more detail hereinafter, crank arms 17 and 18 are adjustable in length, and the length of connecting rod 19 is also adjustable, thus making it possible to establish a specific ratio between the lengths of the crank arms. The value of this ratio is an important factor in the calculation of the optimal time constant of the system.

Figure 1:
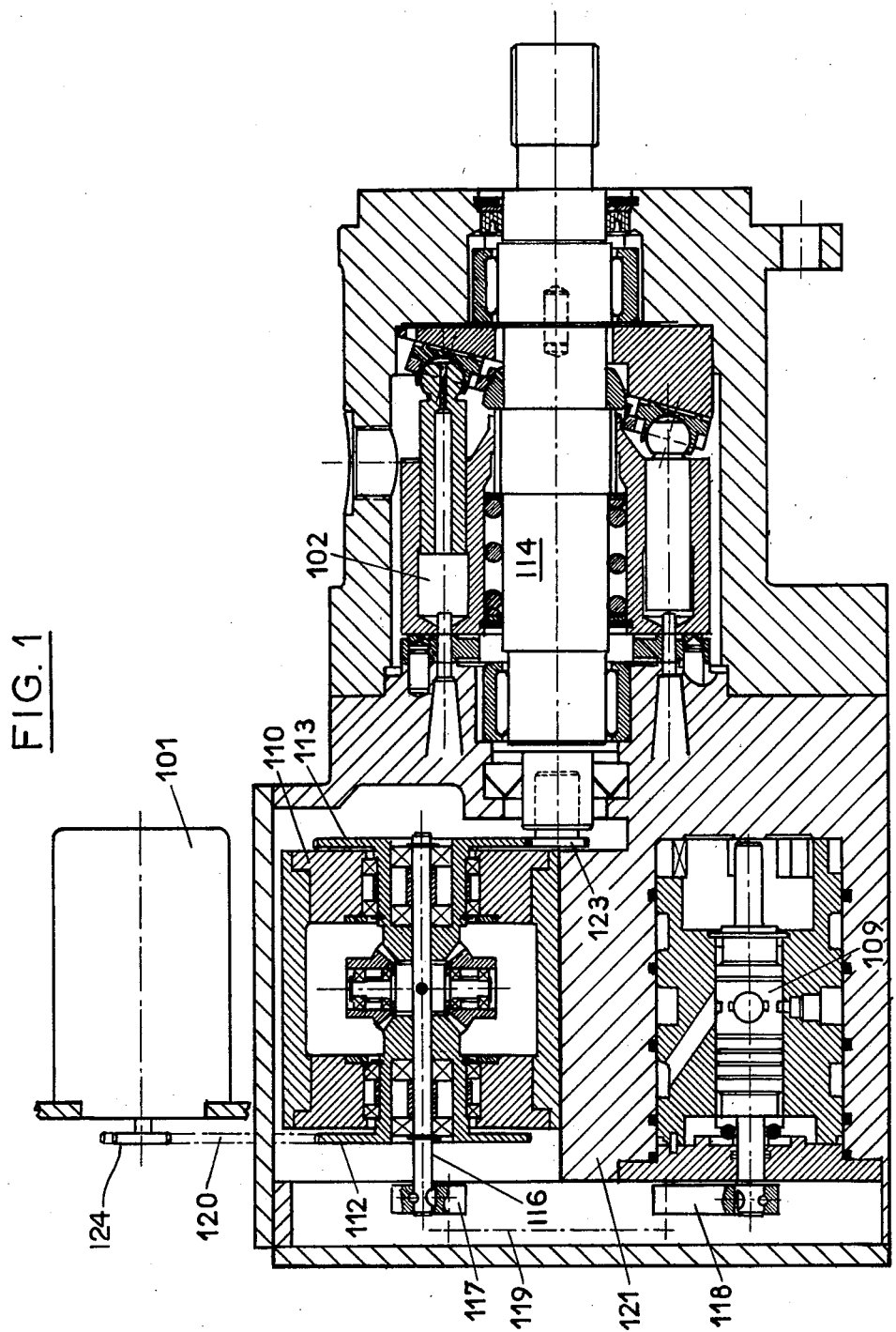
FIG. 1 is a sectional view of a preferred embodiment of the present invention.

Referring now to FIG. 1, there is shown a particularly preferred arrangement of the apparatus of the present invention. The apparatus of FIG. 1 has been designed so as to have a minimum number of hydraulic linkages and mechanical linkages, thus making it possible to obtain the highest degree of precision in the apparatus. As shown in FIG. 1, rotary distributor valve 109 is positioned side-by-side with respect to differential 110 to form a unit where the axis of rotation of the differential and the axis of rotation of the distributor valve are parallel. Since the axes of valve 109 and 110 differential are approximately the same length, these units can be combined in a single housing block 121 of generally parallelopiped shape. Electric motor 101 is arranged beside block 121, with the axis of rotation of the rotor in motor 101 being parallel to the axes of the differential and the rotary distributor valve. As can be seen, this arrangement makes it possible to locate in a single plane the pinion 124 on the output shaft of motor 101 and the output gear 112' of drive train 112; an intermediate idler gear 120 interconnecting gears 124 and 112'. In addition, the hydraulic motor 102 is assembled on block 121 so that the shaft 114 of the hydraulic motor 102 is parallel to the axes of the electric motor 101, differential 110 and rotary distributor valve 109 and in the same plane as the axes of the differential and rotary distributor. A pinion gear 123 in gear train 113 is mounted on the end of motor shaft 122 and directly engages with the large gear 11' of gear train 113. As can also be seen, the arrangement of FIG. 1 permits a convenient and efficient location of the crank arm 117 and 118 and connecting rod 119 of the connecting rod assembly.

In the operation of the device, referring again to FIG. 3, stepped changes in the position of the output shaft of electrical motor 1 are transmitted into differential 10 causing the first differential gear 31 to rotate. This rotation of the first differential gear results in travel of the bevel gears with respect to the differential gears whereby shaft 16 is rotated through shaft 34 to move crank arm 17. The movement of crank arm 17 is transmitted through connecting rod 19 to crank arm 18 whereby the position of distributor valve 9 is changed to, for example, increase the dilivery of hydraulic fluid to motor 2. Motor 2 moves in accordance with delivery of hydraulic fluid thereto, and the movement of the output shaft of motor 2 is transmitted in feedback fashion to the other differential gear 32 of the differential. As the motion of the output shaft of motor 2 is fed back into the differential, it causes travel of the bevel gears back toward their original position, whereby the previously transmitted movement of cranks 17 and 18 and rod 19 are reversed to, for example, reduce the delivery of hydraulic fluid from distributor valve 9 to motor 2. Thus, the output shaft of motor 2 is caused to precisely track the stepwise movements of the output shaft of electric motor 1, and the motion of the output shaft of motor 2 will cease when it has rotated an amount commensurate with the rotation of the output shaft of electric motor 1. Various motion ratios can, of course, be established by different gear train length ratios.

Figure 5:
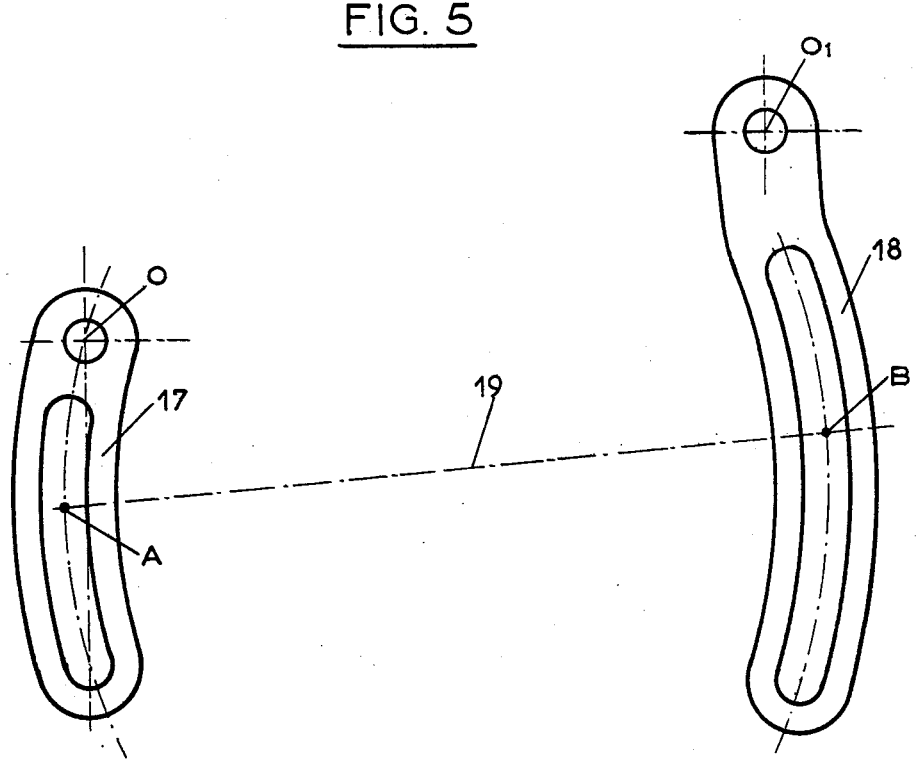
FIG. 5 is a showing of crank arms employed in the present invention.

The control of the ratio between crank arms 18 and 17 is very important as it makes possible the achievement of the optimum compromise between the desired level of precision and the effective damping of the servomechanism. Thus, the lengths of crank arms OA and $O_1B$ (see FIG. 3) are made adjustable and can be controlled, preferably according to the device shown in FIGS. 5 and 6.

Figure 6:
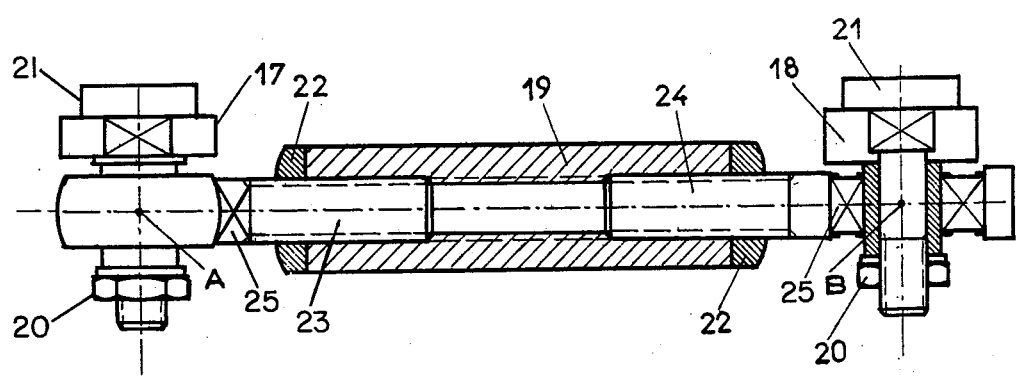
FIG. 6 is a detailed showing of a push rod assembly employed in the present invention.

The levers OA and $O_1B$ are preferably formed in the arcs of circles so as to minimize the adjustment of the length AB of connecting rod 19 when one of the lengths OA or $O_1B$ or both of these lengths are varied. To this end, the arms 17 and 18 each have slots or apertures in circular arcs to form slideways. As shown in FIG. 6, the length AB of connecting rod 19 is also adjustable to make it possible to achieve damping symmetry in both directions of rotation. Rod 19 is threaded to allow the fitting on both ends thereof of two threaded extension pieces 23 and 24, each of which has a nut 22 to lock it in position. The free end of extension pieces 23 and 24 each have a bearing 25 which allows free rotation of the ends of connecting rod 19 around an axis formed by the cylindrical part of the shank of bolts 21 which are located at each end of rod 19. A nut 20 associated with each screw 21 locks the screw in place to fix the location of points A and B. The head of bolts 21 are square shaped where they ride in the slots in arms 17 and 18 so as to immobilize the bolts in rotation relative to the levers.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A hydraulic control apparatus having a mechanical feedback system, said apparatus comprising:
   means providing an input signal in the form of a shaft rotation;
   hydraulic motor means for generating an output signal commensurate with said input signal, said output signal being in the form of a change in the position of an output shaft of said hydraulic motor means;
   differential comparator means for comparing said input and output signals, said comparator means including a pair of differential gears and bevel gear means coupled to two said differential gears, said comparator means also including a rotatable output shaft on which said bevel gear is mounted;
   valve means for controlling the delivery of operating fluid to said hydraulic motor;
   first transmission means connecting said input signal generating means to one of said differential gears of said comparator means;

second transmission means coupling the output shaft of said hydraulic motor means to the other of said differential gears of said comparator means;

first crank means, said first crank means including an adjustable length first crank arm connected at a first end to the output shaft of said comparator means;

second crank means, said second crank means including a second adjustable length crank arm connected at a first end to said valve means for effecting control of said valve means; and connecting rod means interconnecting the second ends of said first and second crank arms of said first and second crank means.

2. The apparatus of claim 1 wherein:

said hydraulic motor means, said valve means and said comparator means each have an axis of operation, all of said axes being in a common plane; and said valve means and said comparator means are positioned with their axes in parallel; and said second transmission means includes gear means on the output shaft of said hydraulic motor means and directly connected to gear means engaged by said second differential gear.

3. The apparatus of claim 1 wherein said input signal providing means comprises:

an electric stepping motor.

4. The apparatus of claim 1 wherein the lengths of said crank means crank arms are adjustable.

5. The apparatus of claim 4 wherein said input signal providing means comprises:

an electric stepping motor.

* * * * *